US011926557B2

(12) United States Patent
Christmann et al.

(10) Patent No.: US 11,926,557 B2
(45) Date of Patent: Mar. 12, 2024

(54) METHOD OF MANUFACTURING A SPECTACLE LENS

(71) Applicant: Carl Zeiss Vision International GmbH, Aalen (DE)

(72) Inventors: Michel-René Christmann, Aalen (DE); Andreu Llobera Adan, Cerdanyola del Vallès (ES); Gerhard Kelch, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 18/304,464

(22) Filed: Apr. 21, 2023

(65) Prior Publication Data

US 2023/0265010 A1 Aug. 24, 2023

Related U.S. Application Data

(63) Continuation of application No. PCT/EP2021/079550, filed on Oct. 25, 2021.

(30) Foreign Application Priority Data

Oct. 23, 2020 (EP) .................... 20203733

(51) Int. Cl.
C03C 17/32 (2006.01)
B29D 11/00 (2006.01)

(52) U.S. Cl.
CPC ........ *C03C 17/32* (2013.01); *B29D 11/00923* (2013.01); *C03C 2217/73* (2013.01); *C03C 2218/119* (2013.01)

(58) Field of Classification Search
CPC .......................... B29D 11/00923; C03C 17/32
See application file for complete search history.

(56) References Cited

U.S. PATENT DOCUMENTS

| | | | | |
|---|---|---|---|---|
| 4,634,449 A | * | 1/1987 | Jenkins | .................... D06P 3/0038/651 |
| 5,316,791 A | | 5/1994 | Farber et al. | |
| 2002/0111390 A1 | | 8/2002 | Lin et al. | |
| 2002/0158354 A1 | * | 10/2002 | Foreman | ............. B29C 33/0038 351/159.74 |
| 2005/0171231 A1 | | 8/2005 | Diggins | |
| 2009/0189303 A1 | | 7/2009 | Diggins et al. | |
| 2010/0039613 A1 | | 2/2010 | Sharma et al. | |
| 2012/0267045 A1 | | 10/2012 | Honda | |
| 2014/0099439 A1 | | 4/2014 | Okubo et al. | |
| 2015/0160477 A1 | | 6/2015 | Dai | |
| 2016/0313574 A1 | * | 10/2016 | Takedomi | ........ B29D 11/00923 |
| 2017/0013167 A1 | | 1/2017 | Saga | |
| 2017/0131567 A1 | | 5/2017 | To et al. | |
| 2018/0141293 A1 | * | 5/2018 | Bothe | ............. B29D 11/00038 |
| 2018/0356563 A1 | * | 12/2018 | Singh | .................... C23C 14/542 |
| 2019/0212580 A1 | | 7/2019 | To et al. | |
| 2019/0310492 A1 | | 10/2019 | Gromotka | |
| 2019/0353925 A1 | | 11/2019 | Biskop et al. | |
| 2020/0159044 A1 | | 5/2020 | To et al. | |

FOREIGN PATENT DOCUMENTS

| | | |
|---|---|---|
| EP | 1433814 A1 | 6/2004 |
| EP | 1561571 A1 | 8/2005 |
| EP | 1602479 A1 | 12/2005 |
| EP | 2578649 A1 | 4/2013 |
| EP | 2682807 A1 | 1/2014 |
| EP | 3339940 A1 | 6/2018 |
| EP | 3531195 A1 | 8/2019 |
| EP | 3812142 A1 | 4/2021 |
| EP | 3928966 A1 | 12/2021 |
| JP | 2010513953 A | 4/2010 |
| JP | 2012128173 A | 7/2012 |
| JP | 2012194547 A | 10/2012 |
| WO | 9739880 A2 | 10/1997 |
| WO | 9906887 A1 | 2/1999 |
| WO | 0018569 A2 | 4/2000 |
| WO | 0056527 A1 | 9/2000 |
| WO | 0194104 A2 | 12/2001 |
| WO | 03058300 A1 | 7/2003 |

(Continued)

OTHER PUBLICATIONS

B. A. Holden et al., "Global Vision Impairment Due to Uncorrected Presbyopia," Arch. Ophthalmol., vol. 126, No. 12, pp. 1731-1739, Dec. 2008.

World Health Organization (WHO), "Universal eye health: a global action plan 2014-2019", pp. 1-22, 2013.

C. S. Y. Lam et al., "Defocus Incorporated Multiple Segments (DIMS) spectacle lenses slow myopia progression: a 2-year randomised clinical trial," Br J Ophthalmol., vol. 104, No. 3, pp. 363-368, May 2019.

Industrial Norm "Ophthalmic optics—Spectacle lenses—Vocabulary (ISO 13666:2019)," English version EN ISO ISO 13666:2019, Dec. 2019.

K. G. Foote et al.,|Ultra-widefield peripheral refraction using a slit-scanning ophthalmoscope and image montaging|, Investigative Ophthalmology & Visual Science, vol. 61, Jul. 2020.

(Continued)

*Primary Examiner* — Elizabeth A Burkhart
(74) *Attorney, Agent, or Firm* — Tautz & Schuhmacher LLC; Georg Hasselmann

(57) ABSTRACT

A method for manufacturing a spectacle lens having a lens substrate and at least one coating is disclosed. The method includes providing a lens substrate having an uncoated or precoated front surface and an uncoated or precoated back surface, applying at least one coating to at least one of the surfaces of the lens substrate, the surface of the at least one coating being modifiable when contacted with at least one medium able to modify the surface of the at least one coating, contacting the surface of the at least one coating, partially or completely, with the at least one medium, considering the individual peripheral refraction, obtaining the spectacle lens having the lens substrate and the at least one coating, the surface of the at least one coating being modified according to the individual peripheral refraction.

19 Claims, No Drawings

(56) References Cited

FOREIGN PATENT DOCUMENTS

| WO | 03078145 | A2 | 9/2003 |
|----|----------|----|--------|
| WO | 2006034652 | A1 | 4/2006 |
| WO | 2006135390 | A2 | 12/2006 |
| WO | 2007066006 | A2 | 6/2007 |
| WO | 2007066006 | A2 | 7/2007 |
| WO | 2008049503 | A2 | 5/2008 |
| WO | 2010075319 | A1 | 7/2010 |
| WO | 2018026697 | A1 | 2/2018 |
| WO | 2019166472 | A2 | 9/2019 |
| WO | 2019166653 | A1 | 9/2019 |
| WO | 2019166654 | A1 | 9/2019 |
| WO | 2019166655 | A1 | 9/2019 |
| WO | 2019166657 | A1 | 9/2019 |
| WO | 2019166659 | A1 | 9/2019 |
| WO | 2019206569 | A1 | 10/2019 |
| WO | 2020078964 | A1 | 4/2020 |

OTHER PUBLICATIONS

European Search Report issued in 20 203 733.9, to which this application claims priority, dated May 7, 2021.
International Search Report and Written Opinion issued in PCT/EP2021/079550, to which this application claims priority, dated Apr. 22, 2022.
International Preliminary Report on Patentability issued in PCT/EP2021/079550, to which this application claims priority, dated Jan. 24, 2023.
Office Action by the Chinese Patent Office (CNIPO) issued in CN 202180072143.1, which is a counterpart hereof, dated Aug. 12, 2023, and English translation thereof.
Office Action by the Japanese Patent Office issued in JP 2023-524746, which is a counterpart thereof, dated Sep. 19, 2023, and English-language translation thereof.

* cited by examiner

METHOD OF MANUFACTURING A SPECTACLE LENS

CROSS REFERENCE TO RELATED APPLICATIONS

This application is a continuation application of international patent application PCT/EP2021/079550, filed on Oct. 25, 2021 and designating the U.S., which claims priority to European patent application EP 20 203 733.9, filed on Oct. 23, 2020, both of which are hereby incorporated by reference in their entireties.

TECHNICAL FIELD

The disclosure relates to a method of manufacturing a spectacle lens.

BACKGROUND

According to Brien A. Holden et al., "Global Vision Impairment Due to Uncorrected Presbyopia," Arch Ophthalmol. 2008; 126(12):1731-1739, uncorrected distance refractive error is the most common cause of vision impairment. In "Universal eye health: a global action plan 2014-2019," World Health Organization 2013, the WHO estimates that in 2010 285 million people were visually impaired. C. S. Y. Lam et al., "Defocus Incorporated Multiple Segments (DIMS) spectacle lenses slow myopia progression: a 2-year randomised clinical trial," Br J Ophthalmol 2019; 0:1-6, tested in a study with children Defocus Incorporated Multiple Segments (DIMS) spectacle lenses, also disclosed for example in U.S. 2017/0131567 A1, U.S. 2019/0212580 A1 or U.S. 2020/0159044 A1, which should impose myopic defocus. The DIMS spectacle lenses were shown to retard myopia progression and axial elongation in myopic children.

U.S. 2017/0131567 A1 discloses a spectacle lens comprising a first refraction area having a first refractive power based on a prescription for correcting an abnormal refraction of an eye and second refraction areas having the function of focusing an image on a position other than the retina of the eye to suppress a progress of the abnormal refraction of the eye. The second refraction areas are formed as a plurality of independent island-shaped areas.

U.S. 2019/0212580 A1 discloses a spectacle lens comprising a first refraction area and second refraction areas as disclosed in U.S. 2017/013167 A1. The second refraction areas according to U.S. 2019/0212580 A1 are dispersedly arranged as a plurality of mutually separate areas, each of these second refraction areas being surrounded by the first refraction area.

U.S. 2020/0159044 A1 discloses a first spectacle lens comprising a first refraction area having refractive power based on a prescription for correcting myopia and second refraction areas having a refractive power different from the first refractive power. Each of the second refraction areas is formed into a convex shape that extends from an object side surface of the spectacle lens. Each of the second refraction areas has a larger curvature than the object side surface of the first refraction area. The second refraction areas comprise a plurality of refraction areas having a plurality of refractive powers different from each other. U.S. 2020/0159044 A1 further discloses a second spectacle lens comprising a first refraction area based on a prescription for correcting myopia and second refraction areas having a refractive power different from the first refractive power. The second refraction areas of the second spectacle lens are non-concentrically formed as a plurality of island-shaped areas, the refractive power of the second refraction areas is larger than the first refractive power of the first refraction area by 2.00 D to 5.00 D. U.S. 2020/0159044 A1 further discloses a third spectacle lens comprising a first refraction area having a first refractive power based on a prescription for correcting an abnormal refraction of an eye and second refraction areas having a refractive power different from the first refractive power. The second refraction areas of the third spectacle lens are non-concentrically formed as a plurality of island-shaped areas arranged to form a hexagon inscribed in a circle having a predetermined radius.

U.S. 2015/0160477 A1 discloses a multi-element lens for controlling defocus and eye diopter dividing the lens into a lens area corresponding to the central view region of the eye and a convex lens area corresponding to the equatorial view region of the eye. The multi-element lens comprises a large unit convex lens generating a large defocus, a small unit concave lens generating small defocus or focus through combination on the large unit convex lens, or a small single lens generating small defocus is separately provided on the large unit convex lens. The junction between the large unit concave lens and the small unit concave lens or the small single lens is a gradual zoom structure or step zoom structure. U.S. 2015/0160477 A1 also discloses on the large unit convex lens a subunit concave lens or a medium single lens, each combination generating medium defocus through combination with the lens of the large unit convex lens. The subunit concave lens or the medium single lens is disposed on the outer ring of the small unit concave lens or the small single lens and is ring-like.

WO 2018/026697 A1 discloses ophthalmic lenses for treating myopia. The lenses include a dot pattern distributed across each lens, the dot pattern including an array of dots spaced apart by a distance of 1 mm or less, each dot having a maximum dimension of 0.3 mm or less. The dots may be arranged on a square grid, a hexagonal grid, another grid, or in a semi-random or random pattern. The dots may be spaced at regular intervals or the dot spacing may vary depending on the distance of the dot from the center of the lens. The dot pattern can include a clear aperture free of dots having a maximum dimension of more than 1 mm, the clear aperture being aligned with a viewing axis of a wearer of the pair of glasses. The clear aperture can be substantially circular or a similar shape. The dots may be protrusions or recesses on a surface of the corresponding lens. The protrusions can be formed from a transparent material. For manufacturing the protrusions, discrete portions of a material are deposited, e.g. by using an inkjet printer, on a surface of the lens corresponding to the dot pattern. The discrete portions provide the protrusions after curing, e.g. using radiation. The dot pattern can reduce an image contrast of an object viewed through the dot pattern by at least 30% compared to an image contrast of the object viewed through the clear aperture. According to WO 2018/026697 A1 the pair of eyeglasses is customized for a wearer, inter alia the lenses thereby having optical power to correct the wearer's on-axis vision to 20/20 or better, the lenses including a dot pattern distributed across each lens, the dot pattern including an array of dots arranged so that, for at least a portion of the wearer's peripheral vision, the lenses correct the wearer's vision to 20/25 or better and reduce an image contrast by at least 30% compared to on-axis image contrast.

WO 2006/034652 A1 discloses a method for treating progression of a refractive disorder in a human eye, in particular a method for counteracting the development of myopia by enhancing myopic defocus and a method for counteracting the development of hyperopia by enhancing of hyperopic defocus. The method includes producing a first image on a retina of the human eye and producing a second image to generate a defocus. To alter the defocus equilibrium of the eye should influence axial eye growth in a direction towards emmetropia. This artificial shift may be introduced by a spectacle lens, typically together with the conventional correction so that normal vision can be maintained. The spectacle lens may be a Fresnel lens or a central-peripheral multi-focal lens including concentric optical zones of two or more optical powers.

WO 2010/075319 A2 discloses a therapeutic treatment method for preventing, ameliorating, or reversing eye-length related disorders. Therefor an artificial blurring of the patient's vision is induced in order to decrease an average spatial frequency of images input to the retina of the eye past a threshold spatial frequency to inhibit further lengthening of the eye. For inducing artificial blurring blur-inducing glasses may be used. The blur-inducing glasses induces the burring by small bumps or depressions in one or both surfaces of the lenses, inclusions within the lenses of a material different from the lens material, incorporation of higher-level aberrations in the lenses, including higher-level aberrations that more greatly affect peripheral vision, providing progressive negative corrections in one or both lenses from the top of the lenses to the bottom of the lenses, coatings or films applied to one or both surfaces of the lenses. Decreasing for example the density of bumps or depressions in the central region of the lens facilitates relatively normal image acquisition for portions of scenes axially aligned with the axis of the eye, while increasingly blurring the portions of scenes that are not aligned with the optical axis. The amount of artificial blurring can be controlled by varying for example the density or the dimensions of the bumps or depressions.

WO 2019/166653 A1 discloses a lens element comprising a refraction area having a refractive power based on a prescription for an eye of a person and a plurality of at least three non-contiguous optical elements with at least one optical element having a non-spherical optical function. At least one of the non-contiguous optical elements may be for example a multifocal refractive micro-lens, made of a birefringent material, a diffractive lens or has a shape configured to create a caustic in front of the retina of the eye of the person.

WO 2019/166654 A1 discloses a lens element comprising a refraction area having a first refractive power based on a prescription for correcting an abnormal refraction of an eye of a person, a second refractive power different from the first refractive power and a plurality of at least three optical elements with at least one optical element having an optical function of not focusing an image on the retina of the eye so as to slow down the progression of the abnormal refraction of the eye. The difference between the first refractive power and the second refractive power may be greater or equal to 0.5 D.

WO 2019/166655 A1 discloses a lens element comprising a refraction area having a refractive power based on a prescription for an eye of a person and a plurality of at least three optical elements. The optical elements are configured so that along at least one section of the lens the mean sphere of optical elements increases from a point of the section towards the peripheral part of the section. The optical elements may be configured so that along at least one section of the lens the mean cylinder of the optical elements increases from a point of the section towards the peripheral part of the section.

WO 2019/166657 A1 discloses a lens element comprising a prescription portion configured to provide to a wearer in standard wearing conditions and for foveal vision a first optical power based on the prescription of the wearer for correcting an abnormal refraction of an eye of the wearer and a plurality of at least three optical elements with at least one optical element having an optical function of not focusing an image on the retina of the eye in standard wearing conditions and for peripheral vision so as to slow down the progression of the abnormal refraction of the eye. At least one of the optical elements may have an optical function of focusing an image on a position other than the retina in standard wearing conditions and for peripheral vision.

WO 2019/166659 A1 discloses a lens element comprising a refraction area having a refractive power based on a prescription for an eye of a wearer and a plurality of at least two contiguous optical elements with at least one optical element having an optical function of not focusing an image on the retina of the eye of the wearer so as to slow down the progression of the abnormal refraction of the eye. Having contiguous optical elements improves according to WO 2019/166659 A1 the aestheticism of the lens element and limits the discontinuity degree of the lens element surface. At least two contiguous optical elements may be independent.

WO 2019/206569 A1 discloses a lens element comprising a prescription portion configured to provide to a wearer in standard wearing conditions a first optical function based on the prescription of the wearer for correcting an abnormal refraction of an eye of the wearer and a plurality of contiguous optical elements. Each optical element has a simultaneously bifocal optical function that provides simultaneously a second optical function in standard wearing conditions and a third optical function of not focusing an image on the retina of the eye in the standard wearing conditions so as to slow down the progression of the abnormal refraction of the eye. Having a plurality of contiguous optical elements that provide simultaneously a second and third optical function, allows according to WO 2019/206569 A1 having an easy to configure lens element that reduces the progression of abnormal refraction of the eye such as myopia or hyperopia by having part of the light focused on the retina of the wearer and part of the light focused either in front or behind the retina of the wearer. Further, the lens element allows selecting the part of the light that is to be focused on the retina and the part of the light that is not to be focused on the retina of the eye. WO 2019/206569 A1 also discloses a method for providing a lens element which comprises providing a lens member configured to provide to the wearer in standard wearing conditions a first refractive power based on the prescription for the wearer for correcting an abnormal refraction of the eye of the wearer, providing an optical patch comprising a plurality of contiguous optical elements and forming a lens element by placing the optical patch on one of the front or back surface of the lens member. Alternatively, the method comprises casting the lens element and during the casting providing an optical patch comprising a plurality of contiguous optical elements.

EP 3 531 195 A1 discloses a spectacle lens comprising a nanostructured and/or micro structured coating. For obtaining the nanostructured and/or micro structured coating, in a first step at least one surface of the uncoated or precoated lens substrate is covered with a layer of nanoparticles and/or microparticles masking the respective uncoated or precoated surface of the lens substrate. In a second step at least one coating is applied to the layer of nanoparticles and/or microparticles. Thereby the at least one coating covers the nanoparticles and/or microparticles as well as the respective uncoated or precoated surface of the lens substrate in the intermediate spaces between the nanoparticles and/or microparticles. In a third step the nanoparticles and/or microparticles are removed and a nanostructured and/or microstructured coating remains on the respective uncoated or precoated surface of the lens substrate.

EP 2 682 807 A1 discloses a method for forming a mark on a surface of a spectacle lens by either applying an additional transparent coating at the desired position of the coating, by including a masking layer having an aperture at a desired position, both the masking layer and the aperture to be overcoated by the coating of the spectacle lens only or by tinting the lens substrate in a desired position. In case an additional transparent coating should be applied, in a first step a masking layer having an aperture is applied to the uncoated or precoated surface of the lens substrate to be marked. In a second step a transparent coating is applied to the masking layer as well as to the respective uncoated or precoated surface via the aperture of the masking layer. In a third step the masking layer and the transparent coating on top of the masking layer are removed, thereby the transparent coating remaining on top of the respective uncoated or precoated surface. Thereafter the transparent coating is overcoated with the coating of the spectacle lens, for example with a multilayer antireflective coating, parts of a multilayer reflective coating and a water repellent layer, thus resulting in the visible mark. The mark may constitute an ornamental pattern, logo, character which can be viewed due to differences in the light reflection thereby ensuring the field of vision of the wearer without discomfort.

EP 3 339 940 A1 discloses a method for applying a coating on an uncoated or precoated surface of a lens substrate via a masking layer to ensure that for example a logo is visible due to the difference of the refractive index of the coating applied with and without masking layer.

WO 2007/066006 A2 discloses a method of transferring a micro-scale pattern onto a surface of an optical article. Therefore, a layer of transferable material is deposited on a surface of a stamp having recesses and protuberances constituting micro-relief corresponding to the pattern to be transferred by contacting the stamp with a not yet dried layer of a latex being deposited on the surface of a substrate of the optical article. Depending on the pressure applied to the stamp the layer of transferable material applied to the protuberances only or the layer of transferable material applied to the recesses and the protuberances is transferred into the layer of latex. After the transfer the stamp is removed.

Additionally to the before mentioned methods, in particular additionally to the (injection) molding and the photolithography, WO 2020/078964 A1 suggests as a method for manufacturing an optical article, the optical article comprising a base lens substrate, an abrasion resistant coating, and at least one optical element protruding from the front surface or from the back surface of the abrasion resistant coating, the additive manufacturing of the at least one optical element protruding from the front surface of the abrasion resistant coating.

EP20182515.5 discloses a method for drying and curing, sintering and/or hardening at least one coating precursor material by applying at least one single electromagnetic pulse. The at least one coating precursor material may comprise a hard coating precursor material in a hard coating. The total process duration needed for drying and curing, sintering and/or hardening at least one coating precursor material is reduced when compared to a conventional thermal curing process applying direct heat for example in an oven. Further, the optical properties and/or the mechanical properties are tuneable when varying the process parameters of the at least one single electromagnetic pulse.

The retina of the eye can grow both in the horizontal and vertical direction. Based on the theory that creating peripheral foci in front of or behind the retina to reduce or to stop the stimulus on the retina of the eye for the eye to grow, several designs for spectacle lenses were proposed as described before. The stimulus stems from a myopic or hyperopic defocus for peripheral vision, i.e., foci being positioned behind the retina or in front of the retina. When correcting the refraction of, for example, a myopic eye with a spectacle lens comprising a first refraction area and second refraction areas according to FIG. 1 of U.S. 2017/013167 A1, in foveal vision viewing through the hexagonal first refraction area having a refractive power based on a prescription for correcting an abnormal refraction of an eye, a light bundle, coming from infinity, is refracted by the first refraction area, the cornea of the eye and the other optical components of the eye to converge to a focus situated directly on the retina, in fact on the fovea of the eye. An object point at infinity forms a perfect image for the spectacle lens wearer. Therefore, in foveal vision the eye is supposed to grow unaltered, subject to anatomical conditions not allowing the unaltered growth. In peripheral vision viewing through one of the second refraction areas shown in FIG. 1 of U.S. 2017/013167 A1 a light bundle, coming from infinity, is refracted by that second refraction area, the cornea of the eye and the other optical components of the eye to converge to a focus situated in front of the retina of the eye. Therefore, in peripheral vision where the foci are situated in front of the retina of the eye, the eye is supposed to reduce the speed of the eye growth or even to stop it completely. However, the retina of the eye is not so uniformly curved that a light bundle, coming from infinity, and being refracted by any one of the second refraction areas, the cornea of the eye and the other optical components of the eye necessarily converges to a focus situated in front of the retina of the eye. Further, the retina of the eye and the anatomy of the eye itself is individually formed or curved and thus not identical for different persons. Even the retina of the left eye and the retina of the right eye of one person are not identically formed or curved. The progression of myopia or hyperopia is not suppressible when correcting the refraction of each spectacle lens wearer with a spectacle lens comprising as for example in FIG. 1 of U.S. 2017/013167 A1 the identical defined first refraction area and the identical defined second refraction areas.

SUMMARY

It is an object of the disclosure to provide a spectacle lens with improved individually adaptable final optical surfaces. A further aspect of the disclosure is to provide a simple and efficient way to individually adapt the final optical surfaces of a spectacle lens. The spectacle lens should focus light bundles in front of or directly on and/or behind the retina of an eye. The position of the foci should be adaptable to the eye.

The object is achieved by a method of manufacturing a spectacle lens having a modifiable surface coating.

DESCRIPTION OF EXEMPLARY EMBODIMENTS

According to ISO 13666:2019(E), section 3.10.13, the prescribed power of a spectacle lens is defined as the dioptric power specified for correction/compensation of a wearer's vision determined by refractive examination. According to ISO 13666:2019(E), section 3.10.3, the dioptric power is the general term comprising the focal power and the prismatic power of a lens. The refractive examination of a wearer's vision is typically carried out as objective refractive examination and/or subjective refractive examination. For objective refractive examination a refractometer or autorefractometer typically is used. Commercially available systems usable for objective refractive examination may comprise at least one of an ocular wavefront aberrometer, an autorefractometer, a corneal topographer and a keratometer. The subjective refraction is usually carried out by an eye care professional. Depending on the system or instrument used for objective refractive examination, the visual axis or line of sight, according to ISO 13666:2019(E), the ray path from the point of interest in object space to the centre of the entrance pupil of the eye and its continuation in image space from the centre of the exit pupil to the retinal point of fixation, is predetermined for example by the fixation target used by the device. During subjective refractive examination the visual axis is predetermined for example by the optotypes shown to the wearer. The calculation of the final optical surfaces of a corrective lens, according to ISO 13666:2019(E), section 3.5.3, a lens with dioptric power, to correct or compensate a wearer's vision is based at least on the prescribed power, the prescribed power typically being determined considering one viewing direction only. WO 2008/049503 A2 describes to take the subjective refractive examination and the objective refractive examination for the calculation of the prescribed power into consideration. To take the subjective refractive examination and the objective refractive examination into consideration already for the calculation of the prescribed power is an accurate and individual basis for the calculation of the final optical surfaces of a corrective lens.

To further improve the accuracy of the final optical surfaces of a corrective lens and especially to further improve the individual adaptability of the final optical surfaces of a corrective lens not only at least one of the objective refractive examination and the subjective refractive examination but also the peripheral refraction is taken into consideration. As disclosed in K. G. Foote, C. Leahy, M. Everett, J. Straub, "Ultra-widefield peripheral refraction using a slit-scanning ophthalmoscope and image montaging," investigative Ophthalmology & Visual Science July 2020, Vol. 61, PB00151, ARVO Imaging in the Eye Conference Abstract, July 2020, iovs.arvojournals.org/article.aspx?articleid=2770401&resultClick=1, last retrieved on Oct. 12, 2020, a widefield slit-scanning ophthalmoscope can be used to measure peripheral refraction. The peripheral refraction of at least one wearer's eye is an indirect means to take the anatomical conditions of the at least one wearer's eye into consideration for the calculation of the final optical surfaces of a corrective lens. Knowing the peripheral refraction makes the precise knowledge of the anatomical conditions of at least one wearer's eye superfluous as the peripheral refraction indirectly already considers the anatomical conditions of the at least one wearer's eye, such as the individual distances within the and the individual refractive indices of each eye. As the anatomical conditions varies not only from eye to eye but also the identical eye may alter for example due to growth, age or disease, the measurement of the peripheral refraction is an indirect means for considering the individual anatomical conditions of each eye without the necessity of for example a highly complex determination of each and every distance within the eye, for example the distance from the cornea to the front surface of the lens or the distance from the front or the back surface of the lens to the fovea, without the necessity of a highly complex determination of the different refractive indices within the eye or within one optical component of the eye and/or without the necessity of a precise knowledge of the surface topography of the retina.

Typically, the final optical surfaces of the corrective lens are individually adapted for foveal vision as well as for peripheral vision. To correct or compensate a wearer's foveal vision the subjective refractive examination and/or the objective refractive examination, typically at least the subjective refractive examination, is taken into consideration for the calculation of the final optical surfaces of the finished lens. To simultaneously correct or compensate a wearer's peripheral vision, typically the measurement of the peripheral refraction is taken into consideration.

Further typically, the final optical surfaces of a corrective lens optimally correct or compensate a wearer's foveal vision with minimal imaging aberrations and optimally correct or compensate a wearer's peripheral vision. The corrective lens typically comprises a lens substrate and at least one coating. To optimally correct or compensate a wearer's foveal vision based on at least the subjective refractive examination an established grinding and polishing process of the lens substrate may be used. The at least one coating of the corrective lens is assumed to have the same final optical surface, within manufacturing tolerances, as the surface of the lens substrate which comprises the at least one coating. The at least one coating may be part of a coating sequence. To further optimally correct or compensate a wearer's peripheral vision, typically based on the measurement of the peripheral refraction, typically the final optical surface of at least one of the coatings of the corrective lens is modified. The modification of the final optical surface of at least one of the coatings of the corrective lens is typically individually adaptable, typically individually adaptable to the measured peripheral vision of at least one wearer's eye. Typically, foveal vision is not impaired by the individual modification typically of at least one of the coatings of the corrective lens as the individual modification is only with respect to peripheral vision. Phrased differently, the modification of the final optical surface of at least one of the coatings of the corrective lens ensures the individual adaption not only with respect to foveal vision but also with respect to peripheral vision.

A very reliable method for manufacturing any desired optical surface is disclosed in EP 3 812 142 A1. The method disclosed in EP 3 812 142 A1 allows even the manufacturing of final optical surfaces which are not accessible by conventional grinding and polishing processes. The method disclosed herein is independent of the optical material to be used for the lens substrate. The method requires at least one coating completely or at least partially covering the uncoated or precoated lens substrate, the at least one coating being modifiable when contacting with at least one medium. The modification of the at least one coating is typically irreversible and of long-term stability. In contrast to EP 3 531 195 A1, for example, no additional coating is required to modify or to adapt and/or to create any desired final optical surface. However, as described in EP 3 812 142 A1 the period of time for contacting the at least one coating modifiable when contacted with at least one medium able to modify the at least one coating lies within a range of typically 25 minutes to 30 hours, further typically 30 minutes to 20 hours, more typically 35 minutes to 15 hours and most typically 40 minutes to 10 hours. The at least one coating may be contacted with the at least one medium at room temperature, i.e., at a temperature of 22° C. ±2° C., or at elevated temperatures comprising a temperature range of typically 25° C. to 80° C., further typically 27° C. to 55° C., more typically 30° C. to 50° C. and most typically 35° C. to 45° C. The at least one coating may be contacted with the at least one medium while irradiation with xenon typically of a wavelength range of 280 nm to 1200 nm. The in EP 3 812 142 A1 disclosed and before mentioned process conditions may be combined in any desired way.

Although the method disclosed in EP 3 812 142 A1 is a versatile method for creating any desired final optical surface, thus circumventing the need of impractical or more complicated manufacturing methods. WO 2019/166653 A1, WO 2019/166654 A1, WO 2019/166655 A1, WO 2019/166657 A1 and WO 2019/166659 A1 for example suggest for manufacturing of the spectacle lenses described therein different technologies such as direct surfacing, molding, casting or injection, embossing, filming, or photolithography. Using for example a molding process for manufacturing one the spectacle lenses described in U.S. 2017/013167 A1, WO 2019/166653 A1, WO 2019/166654 A1, WO 2019/166655 A1, WO 2019/166657 A1 or WO 2019/166659 A1 requires each a master mold of extremely high robustness and of high quality to be able to obtain the respective optical surfaces. A mold made of glass would fulfill the before mentioned requirements but is challenging and expensive to process. Using a molding process would require a different master mold for each optical surface to be realized therewith, which is for example for efficiency and cost reasons not suitable or at least not the first choice in a high throughput manufacturing process. The method disclosed in EP 3 812 142 A1 combined not only with the knowledge which correction is needed by the wearer for foveal vision but also with the knowledge peripheral refraction as described before is a further improvement in individualizing the method disclosed in EP 3 812 142 A1 to the actual needs of the wearer. With the knowledge of the peripheral refraction neither the knowledge of the exact form and curve of the retina nor an assumed or approximated knowledge thereof as for example mentioned in WO 2019/166657 A1 is required.

Further, to individually adapt the surface topography of the final optical surface the as-worn position, according to EN ISO 13666:2019(E), section 3.2.36, the position, including orientation, of the lenses (3.5.2) relative to the eyes and face during wear is typically considered.

For the individual modification of at least one of the coatings of the corrective lens, at least one of the coatings is typically irreversibly modified. The at least one coating to be irreversibly and individually modifiable is at least one coating that typically itself is irreversibly modifiable, typically irreversibly modifiable when contacting with at least one medium that can cause the irreversible modification. The irreversible modification is an irreversible modification of the at least one coating itself, i.e., in contrast to for example EP 3 531 195 A1 no additional or subsequent coating needs to be applied for the irreversible modification of the at least one coating. Further, the at least one medium used for contacting with the at least one coating is not to be confused with the layer of nanoparticles and/or microparticles used for example in EP 3 531 195 A1 for masking a surface to be coated. The irreversible modification of the at least one coating is typically evoked by contacting the at least one coating at each specific position and/or each specific region that is to be modified with at least one medium able to cause the irreversible modification. The irreversible modification of the at least one coating typically is an irreversible swelling of the at least one coating, caused by contacting the surface of the at least one coating with at least one medium able to cause irreversible swelling. The irreversible swelling of the at least one coating may be observed as protrusion or as depression. In case the irreversible swelling is observed as protrusion typically most of the surface has not been modified or swollen. In case the irreversible swelling is observed as depression typically most of the surface has been modified or swollen.

To modify the at least one coating at a specific position and/or at a specific region the at least one coating may be applied to an uncoated or precoated surface of the lens substrate to either fully cover the adjacent surface underneath or to partially cover the adjacent surface underneath. The uncoated or precoated surface may be partially covered with the at least one coating in that only the parts of the uncoated or precoated surface are covered with the at least one coating that is to be modified and no further parts of the uncoated or precoated surface are covered therewith.

The individual modification of the at least one coating may be local or extensive. The individual modification may be of any arbitrary form or shape. The individual modification may define densely packed structures or not densely packed structures. The structures may be contiguous or non-contiguous. The individual modification may comprise a micrometer scale structure of any arbitrary shape and form. The aspect ratio, i.e., the ratio from height or depth to the smallest lateral extension, of each individual modification may be tunable. The individual modification may comprise at least one structure that may behave as micro lens or may comprise at least two structures acting optically collectively. The shape of an individual modification may be Gaussian shaped or may be complex shaped. The individual modification may result in individually adaptable dioptric powers at specific positions.

The individual modification is observed as an individual swelling which in turn is assumed to be a diffusion-controlled swelling. The diffusion-controlled swelling is assumed to be dependent on or restricted at least by the time the at least one medium is in contact with the at least one coating and the contact surface between the at least one medium and the at least one coating.

A substantial advantage of the individualizable modification of the at least one coating by the individually adaptable swelling of the at least one coating that is irreversible swellable when contacted with at least one medium is that individual anatomical conditions of a wearer's eye(s) are easily and efficiently considerable and easily and efficiently feasible in the final optical surfaces. A further advantage of the individualizable modification of the at least one coating by the individually adaptable swelling thereof is that even surface topographies, structures and/or patterns which are not accessible by conventional abrasive methods such as conventional grinding and/or polishing processes, are readily accessible. The surfaces topographies, structures and/or patterns readily accessible by the individually accessible swelling of the at least one coating may be accessible in a molding process as well. However, as each individually adapted final optical surface is unique and insofar not to be produced in high quantities a molding process would require the manufacture a new mold each time which is costly and not practicable. Therefore, the individually adaptable swelling process is typical. It is self-evident that the swelling process is not only applicable to cause an individually adaptable swelling of the at least one coating but also to manufacture a standardized surface pattern, for example the ones disclosed in U.S. 2017/0131567 A1 or any other citation mentioned before.

In case the surface topographies, structures and/or patterns are not coated with at least one further coating which is not swellable when contacted with at least one medium, the final optical surface of the at least one coating which is swellable when contacted with at least one medium may be further modified or readapted at a later stage, if necessary, for example in reaction to changed anatomical conditions of a wearer's eye.

To individually modify the final optical surface of at least one of the coatings of the corrective lens, typically at least one of the coatings needs to be irreversibly modifiable when contacting with at least one medium, further typically needs to be irreversibly swellable when contacting with at least one medium. To irreversibly swell the at least one coating when contacting with at least one medium, the surface of the at least one coating may be masked in such that only the at least one position and/or the at least one region to be modified is exposed for contacting with the at least one medium. After contacting with the at least one medium the mask is typically removable without any residues o the surface masked therewith. Typically, the mask has an excellent adherence to the substrate, is patternable, withstands the contacting with the at least one medium at least during the contact time, and is easily removable without any residues. As mask a pressure-sensitive adhesive, a metal mask, a foil and/or a photoresist may be used. The patterning of the mask depends on the mask to be used. For masks comprising at least one pressure-sensitive adhesive or at least one foil laser ablation is typical for patterning. For a metal mask a lift off process is typical for patterning. In such a lift off process initially the negative of the mask typically is applied to the surface is imprinted or printed, for example via an inkjet printing method, using for example a wax. Then the whole surface, i.e., including the negative, is covered by a metal layer obtained for example via a physical vapor deposition process. Finally, the negative is removed, for example a wax can be removed by an organic solvent, thus leaving at least one specific position and/or at least one specific region of the surface exposed for contacting with the at least one medium. For a mask comprising at least one photoresist, typically UV irradiation through a predefined pattern is used. After contacting the surface to be modified or for practicability reasons the whole surface, i.e., the surface to be modified and the masked surface, with the at least one medium, and optionally after exposure to the source used for accelerated surface modification, the respective mask and the at least one medium are removed. A mask comprising a pressure sensitive adhesive or a photoresist may be removed by cleaning with an organic solvent, such as ethanol, isopropanol or acetone. A mask comprising a foil may be pulled off. A mask comprising a metal may be removed by cleaning with aqua regia.

Alternatively and typically to masking the surface to be modified and contacting the surface to be modified, or typically for practicability reasons the whole surface, i.e., including the masked part thereof, with at least one medium, the at least one medium is selectively applied to the at least one specific position and/or the at least one specific region of the surface of the at least one coating to be modified. The at least one medium is typically applied by a printing method, typically by inkjet printing.

Alternatively to masking the surface and to selectively applying the at least one medium, the at least one coating to be modified is selectively applied and contacted with the at least one medium able to modify the at least one coating. The at least one coating modifiable by contacting with at least one medium is typically selectively applied to the at least one specific position and/or the at least one specific region by a printing method, typically by ink jet printing.

The at least one coating modifiable when contacted with at least one medium is typically a photochromic coating or a coating based on a coating composition usable for a photochromic coating but without any photochromic dye. The corrective lens may comprise the at least one modifiable coating on the front surface and on the back surface. In case the at least one modifiable coating is a photochromic coating or is a coating based on a coating composition usable for a photochromic coating but the coating composition is not comprising a photochromic dye, only the front surface of the corrective lens comprises the respective at least one coating. The modification of the final optical surface is typically a modification or adaption of the final optical surface considering peripheral vision and not impairing foveal vision. A modification or an adaption of the final optical surface considering peripheral vision and not impairing foveal vision is typically a subsequent change of a final optical surface. Hereby the final optical surface is final with respect to foveal vision. The modification or adaption of the final optical surface considering the peripheral vision typically is a subsequent modification of the final optical surface resulting in at least one micro lens. The at least one micro lens may have any arbitrary shape or form individually adapted considering the peripheral refraction of a wearer's eye(s). In case the subsequent modification of the final optical surface results in at least two micro lenses of any arbitrary shape or form, the at least two micro lenses are distributed across the surface considering the individual peripheral refraction. The arbitrary shape or form of the at least two micro lenses may be identical or different to each other, each considering the individual peripheral refraction. The at least one micro lens or the at least two micro lenses are typically not impairing foveal vision.

The at least one photochromic coating may for example be based on a photochromic composition described in EP 1 433 814 A1, EP 1 602 479 A1, or EP 1 561 571 A1. The at least one coating based on a coating composition usually resulting in a photochromic composition may comprise a composition described in EP 1 433 814 A1, EP 1 602 479 A1, or EP 1 561 571 A1, but without any photochromic dye.

EP 1 433 814 A1, in particular EP 1 433 814 A1, claim 1, discloses a photochromic composition comprising (1) 100 parts by weight of radically polymerizable monomers; (2) 0.01 to 20 parts by weight of an amine compound; and (3) 0.01 to 20 parts by weight of a photochromic compound, the radically polymerizable monomers including a radically polymerizable monomer having a silanol group or a group which forms a silanol group by hydrolysis, and/or a radically polymerizable monomer having an isocyanate group. According to EP 1 433 814 A1 to increase adhesion between the photochromic coating resulting from the photochromic composition described therein and a spectacle lens substrate, a radically polymerizable monomer having a silanol group or a group which forms a silanol group by hydrolysis or a radically polymerizable monomer having an isocyanate group is used. Usable monomers are mentioned in EP 1 433 814 A1, page 3, paragraph [0025], to page 7, paragraph [0046]. Additionally, according to EP 1 433 814 A1 the photochromic composition may include other radically polymerizable monomers. As other polymerizable monomers, a combination of a radically polymerizable monomer having a homopolymer L-scale Rockwell hardness of at least 60 ("high-hardness monomer") and a radically polymerizable monomer having a homopolymer L-scale Rockwell hardness of 40 or less ("low-hardness monomer") is typically used to improve the characteristic properties such as solvent resistance, hardness and heat resistance of the resulting photochromic coating or the photochromic properties thereof such as color development intensity and fading speed. Examples and explanations with respect to the high-hardness monomers and the low-hardness monomers are given in EP 1 433 814 A1, page 7, paragraph [0052], to page 13, paragraph [0096]. To improve the balance of the characteristic properties such as solvent resistance, hardness and heat resistance or photochromic properties such as color development intensity and fading speed of the resulting photochromic coating, the amount of a low-hardness monomer is typically 5 to 70% by weight and the amount of a high-hardness monomer is typically 5 to 95% by weight based on the total of all the other radically polymerizable monomers excluding the radically polymerizable monomer having a silanol group or a group which forms a silanol group by hydrolysis and the radically polymerizable monomer having an isocyanate group. Further, according to EP 1 433 814 A1, it is particularly typical that a monomer having at least three radically polymerizable groups should be contained as the high-hardness monomer in an amount of at least 5% by weight based on the total of all other radically polymerizable monomers. Further typically, according to EP 1 433 814 A1, the radically polymerizable monomers include a radically polymerizable monomer having at least one epoxy group and at least one radically polymerizable group in the molecule besides the mentioned monomers classified by hardness. The durability of a photochromic compound and the adhesion of the photochromic coating can be improved by using the radically polymerizable monomer having at least one epoxy group. Radically polymerizable monomers having at least one epoxy group and at least one radically polymerizable group in the molecule are disclosed in EP 1 433 814 A1, page 13, paragraph [0101], to page 14, paragraph [0105]. According to EP 1 433 814 A1, the amount of the radically polymerizable monomer having at least one epoxy group and at least one radically polymerizable group in the molecule is typically 0.01 to 30% by weight, particularly typically 0.1 to 20% by weight based on the total of all other radically polymerizable monomers. The photochromic composition described in EP 1 433 814 A1 comprises at least one amine compound in an amount of 0.01 to 20 parts by weight based on 100 parts by weight of the total of all the radically polymerizable monomers in addition to the above mentioned radically polymerizable monomers. Examples for the at least one amine compound is given in EP 1 433 814 A1, page 14, paragraph [0108], to page 15, paragraph [0112]. The photochromic composition disclosed in EP 1 433 814 A1 comprises at least one photochromic compound in an amount of 0.01 to 20 parts by weight, typically 0.05 to 15 parts by weight and more typically 0.1 to 10 parts by weight based on 100 parts by weight of the total of all radically polymerizable monomers. Examples for photochromic compounds are given in EP 1 433 814 A1, page 15, paragraph [0114] to page 20, paragraph [0122].

EP 1 602 479 A1, in particular EP 1 602 479 A1, claim 9, discloses a photochromic composition comprising 100 parts by weight of a radically polymerizable monomer, 0.001 to 5 parts by weight of a silicone base or fluorine base surfactant and 0.01 to 20 parts by weight of a photochromic compound. According to EP 1 602 479 A1, the photochromic composition comprises a radically polymerizable monomer having a silanol group or a group which forms a silanol group by hydrolysis, an amine compound and a photochromic compound. The use amount of the radically polymerizable monomer having a silanol group or a group which forms a silanol group by hydrolysis is suitably 0.5 to 20% by weight, particularly 1 to 10% by weight based on the total weight of the whole coating agents. Other radically polymerizable monomers which according to EP 1 602 479 A1 can be used together with the radically polymerizable monomer having a silanol group or a group which forms a silanol group by hydrolysis, such as for example trimethylolpropane trimethacrylate, trimethylolpropane triacrylate, tetramethylolmethane trimethacrylate, tetramethylolmethane triacrylate, trimethylolpropane triethylene glycol triacrylate, pentaerythritol tetramethacrylate, dipentaerythritol hexaacrylate, urethane oligomer tetraacrylate, urethane oligomer hexamethacrylate, urethane oligomer hexaacrylate, polyester oligomer hexaacrylate, diethyleneglycol dimethacrylate, triethyleneglycol dimethacrylate, tetraethyleneglycol dimethacrylate, tripropyleneglycol dimethacrylate, bisphenol A dimethacrylate, 2,2-bis(4-methacryloyloxyethoxy-diphenyl) propane, glycidyl methacrylate, 2,2-bis(4-acryloyloxypolyethylene glycol phenyl)propane having an average molecular weight of 776 or methyl ether polyethylene glycol methacrylate having an average molecular weight of 475. The use amount of the other radically polymerizable monomers is suitably 20 to 90% by weight, particularly 40 to 80% by weight based on the weight of the whole coating agents. The use amount of the amine compound, such as triethanolamine, N-methyldiethanolamine, triisopropanolamine, N,N-dimethylaminoethyl methacrylate or N,N-diethylaminoethyl methacrylate for example, is suitably 0.01 to 15% by weight, particularly 0.1 to 10% by weight based on the weight of the whole coating agents. The use amount of the photochromic compound such as a naphthopyran derivative, a chromene derivative, a spirooxazine derivative, a spiropyran derivative or a fulgimide derivative is suitably 0.1 to 30% by weight, particularly 1 to 10% by weight based on the weight of the whole coating agents.

In case the spectacle lens comprises at least one photochromic coating, typically the front surface of the corrective lens comprising the at least one photochromic coating, the corrective lens may optionally comprise at least one photochromic primer. Typically the front surface of the corrective lens comprises the at least one photochromic primer and the at least one photochromic coating, the photochromic coating being the outermost coating thereof. The at least one photochromic primer may comprise the polyurethane resin layer disclosed in EP 1 602 479 A1, in particular in EP 1 602 479 A1, claim 1, or the primer layer disclosed in WO 03/058300 A1, in particular in WO 03/058300 A1, page 22, line 3 to page 23, line 13.

The at least one medium able to modify the at least one coating typically is at least one organic acid. The at least one medium typically comprises at least one organic aliphatic saturated or unsaturated, optionally substituted, monocarboxylic acid. The at least one medium typically comprises at least one organic aliphatic saturated or unsaturated monocarboxylic acid comprising 2 to 22 carbon atoms, typically 3 to 18 carbon atoms. As at least one medium acetic acid, propionic acid, acrylic acid, lactic acid, butyric acid, isobutyric acid, valeric acid, heptanoic acid, caproic acid, caprylic acid, pelargonic acid, myristoleic acid, palmitoleic acid, linoleic acid, alpha linolenic acid, gamma linolenic acid, oleic acid, ricinoleic acid, stearidonic acid, arachidonic acid, eicosapentaenoic acid, docosapentaenoic acid and/or docosahexaenoic acid may be used, for example. Typically, the at least one medium comprises at least one acid selected from the group consisting of acetic acid, lactic acid, butyric acid, caproic acid, caprylic acid, pelargonic acid, linoleic acid, alpha linolenic acid, gamma linolenic acid and oleic acid. More typically, the at least one medium comprises at least one acid selected from the group consisting of lactic acid, caprylic acid and oleic acid. Alternatively or additionally, the at least one medium may comprise a tricarboxylic acid such as citric acid for example or an inorganic acid such as hydrochloric acid for example. As at least one medium one of the before mentioned or any combination thereof may be used. The at least one medium may be used in commercially available grade or commercially available quality or the at least one medium may be used diluted. In case the at least one medium is applied via ink jet printing the viscosity of the at least one medium may have to be adjusted for being printable.

The at least one medium able to modify the at least one coating typically is only temporarily in contact with the at least one coating. The at least one medium is either (i) removed by the application of at least one single electromagnetic pulse or by the application of single electromagnetic pulses or (ii) is removed after the at application of at least one single electromagnetic pulse or after the application of single electromagnetic pulses, e.g. by simply wiping or rinsing off. So the at least one medium is not to remain as additional material or coating on the at least one coating.

To accelerate the creation of the individually adaptable final optical surface using the method disclosed before, after contacting the surface of the at least one coating with the at least one medium at least one single electromagnetic pulse may be applied to at least one surface of a spectacle lens comprising a lens substrate, the at least one coating and the at least one medium. The at least one single electromagnetic pulse can be applied from at least one electromagnetic source selected from the group consisting of at least one flash lamp, typically from at least one xenon flash lamp, at least one halogen lamp, at least one directed plasma arc, at least one laser, at least one microwave generator, at least one induction heater, at least one electron beam, at least one stroboscope and at least one mercury lamp. The at least one single electromagnetic pulse is typically applied from at least one flash lamp. Typically the at least one flash lamp is a flash lamp filled with a gas selected from xenon, krypton and/or argon, typically xenon. The at least one single electromagnetic pulse has typically a wavelength in the range from 100 nm to 1800 nm, more typically in the range from 150 nm to 1300 nm, most typically in the range from 200 nm to 1000 nm. The at least one single electromagnetic pulse also typically has a wavelength in the range from 350 nm to 1000 nm, more typically in the range from 400 nm to 800 nm, most typically in the range from 420 nm to 700 nm. The wavelength of the at least one single electromagnetic pulse applied from at least one of the before mentioned electromagnetic sources is typically in these wavelength ranges. The at least one single electromagnetic pulse is applied to at least one of the surfaces of the spectacle lens, i.e., (i) to the front surface of the spectacle lens, (i) to the back surface of the spectacle lens or (iii) to the front surface and the back surface of the spectacle lens. In case (iii) when at least one single electromagnetic pulse is to be applied to the front surface and the back surface of the spectacle lens the position of one of the electromagnetic sources mentioned before may be alternated so that the at least one single electromagnetic pulse is either directly applied to the front surface or directly applied to the back surface of the spectacle lens. Alternatively, in the before mentioned case (iii) at least two of the electromagnetic sources mentioned before are positioned in that the at least one single electromagnetic pulse is directly applied to the front surface of the spectacle lens and at least one single electromagnetic pulse is directly applied to the back surface of the spectacle lens, either simultaneously or alternately. In any case at least two electromagnetic sources are used these at least two electromagnetic sources may be of the identical type or of a different type.

In case only one of the surfaces of the spectacle lens comprises at least one coating being modifiable when contacted with at least one medium, the at least one single electromagnetic pulse may be applied to the surface of the spectacle lens comprising the the at least one coating or the at least one single electromagnetic pulse may be applied to the surface of the spectacle lens not comprising the at least one coating. Again, reference is made to the explanation below. In case both the front surface and the back surface of the spectacle lens each are comprising at least one coating each being modifiable when contacted with at least one medium, the at least one single electromagnetic pulse may be applied to (i) the front surface of the spectacle lens, (ii) the back surface of the spectacle lens or (iii) the front surface and the back surface of the spectacle lens. In the case (iii) the before mentioned possibilities with respect to the electromagnetic source are applicable.

Taking into consideration that EP 3 812 142 A1 already suggests an irradiation with xenon light typically having a wavelength range of 280 nm to 1200 nm, it has been even more surprising that applying at least one single electromagnetic pulse for example and typically emanating from at least one flash lamp filled with xenon gas, i.e., by using a photonic curing method, is reducing significantly the total process duration for obtaining the final optical surface of the at least one coating modifiable when contacted with at least one medium being able to modify the at least one coating. Further, to reduce the total process duration compared to the method described in EP 3 812 142 A1 apart from the application of at least one single electromagnetic pulse no additional effort is necessary. In other words, the contacting of at least one coating being modifiable when contacted with at least one medium being able to modify the at least one coating results after the application of at least one single electromagnetic pulse, i.e., by using the photonic curing technique, in any desired or targeted final optical surface of the at least one coating in compared to the method described in EP 3 812 142 A1 a significantly reduced total process duration.

"Single electromagnetic pulse" means the light that is delivered by at least one of the above-mentioned electromagnetic sources and applied to at least one surface of the spectacle lens comprising the at least one modifiable coating, the at least one modifiable coating thereby being completely or at least partially in contact with the at least one medium or completely or at least partially covered by the at least one medium. The at least one single electromagnetic pulse may be applied in one of the wavelength ranges defined above. The at least one single electromagnetic pulse typically has a defined duration, i.e., a defined envelope. The envelope of the at least one single electromagnetic pulse is defined as the period in which the at least one single electromagnetic pulse is applied to the at least one surface of the spectacle lens comprising the at least one coating, the at least one coating being completely or at least partially covered by the at least one medium. The envelope of the at least one single electromagnetic pulse is further defined as the period in which the at least one single electromagnetic pulse is applied to the at least one surface of the spectacle lens not comprising at least one coating being modifiable when contacted with at least one medium or covered by at least one medium, the at least one medium being able to modify the at least one coating. The envelope may be in a range from 50 µs to 200 ms, typically in a range from 100 µs to 150 ms. Each single electromagnetic pulse may comprise at least two micro-pulses, each of the at least two micro-pulses having a defined duration within the envelope of each single electromagnetic pulse. The duration of the at least two micro-pulses within the envelope of a single electromagnetic pulse may be identical to or different from each other. The percentage of the duration of all the micro-pulses within the envelope of a single electromagnetic pulse is defined as the duty cycle of the single electromagnetic pulse. Further, the at least one single electromagnetic pulse or at least one micro-pulse has a defined peak intensity. The peak intensity is defined as the rate at which light energy is applied per unit time to a unit area of the at least one coating, the at least one coating being covered completely or at least partially by the at least one medium, by one single electromagnetic pulse or one micro-pulse within a single electromagnetic pulse. The peak intensity is typically in the range from 0.01 W/cm$^2$ to 200 W/cm$^2$, further typically in the range from 0.1 W/cm$^2$ to 150 W/cm$^2$, more typically from 0.5 W/cm$^2$ to 100 W/cm$^2$ and most typically from 1 W/cm$^2$ to 60 W/cm$^2$. The peak intensity of at least two micro-pulses within the envelope of a single electromagnetic pulse may be identical to or different from each other. Typically the peak intensity of the at least two micro-pulses within the envelope of a single electromagnetic pulse is identical to each other. The peak intensity between two consecutive micro-pulses within the envelope of a single electromagnetic pulse does not need to be zero or does not need to be constant or does not need to be equal. If necessary, each single electromagnetic pulse may be repeated to provide an electromagnetic pulse train. Within the electromagnetic pulse train, each single electromagnetic pulse may be repeated at least twice and up to 1000 times, typically each single electromagnetic pulse is repeated between 2 and 100 times. Within an electromagnetic pulse train, typically an identical single electromagnetic pulse is repeated. Within an electromagnetic pulse train, the envelope of each single electromagnetic pulse may be identical to or different from each other. Typically, within an electromagnetic pulse train, the envelope of each single electromagnetic pulse is identical. Within an electromagnetic pulse train, each single electromagnetic pulse may comprise at least two micro-pulses, the at least two micro-pulses may be identical to or different from each other with respect to their peak intensity, duration and/or duty cycle. Typically, within an electromagnetic pulse train, each single electromagnetic pulse may comprise at least two micro-pulses, the at least two micro-pulses being identical to each other with respect to their peak intensity, duration and/or duty cycle. Within the electromagnetic pulse train comprising at least two single electromagnetic pulses, the at least two single electromagnetic pulses may be repeated with a repetition rate in a range from 0.1 Hz to 5 Hz, typically from 0.2 Hz to 4 Hz, further typically from 0.3 Hz to 3.5 Hz and most typically from 0.4 to 2 Hz. The peak intensity of at least one single electromagnetic pulse within the envelope of the at least one single electromagnetic pulse may progressively decrease within the envelope and/or with each micro-pulse within the at least one single electromagnetic pulse. For example, this decrease can be due to limitations of the charged capacitors of the electromagnetic source used for generating the at least one single electromagnetic pulse. The dose applied by at least one single electromagnetic pulse to the spectacle lens comprising the at least one coating, the at least one coating being covered completely or at least partially with the at least one medium, is the average intensity delivered with each single electromagnetic pulse over the total duration of the envelope where each single electromagnetic pulse may or may not comprise at least two micro-pulses each delivering a discrete amount of intensity. The dose applied by at least one single electromagnetic pulse may typically be within the range from 0.001 J/cm$^2$ to 50 J/cm$^2$, further typically from 0.1 J/cm$^2$ to 30 J/cm$^2$, more typically from 1 J/cm$^2$ to 20 J/cm$^2$ and most typically from 2.0 J/cm$^2$ to 15 J/cm$^2$. Particularly typically, the dose applied is within a range from 3 J/cm$^2$ to 8 J/cm$^2$.

Any variation of any one of the before mentioned process parameters of the at least one single electromagnetic pulse may influence the optical surface obtained when the at least one single electromagnetic pulse is applied to the at least one coating being modifiable with at least one medium. Further, any variation of any one of the before mentioned process parameters of the at least one single electromagnetic pulse may influence the optical surface obtained when the at least one single electromagnetic pulse is applied to the surface of the spectacle lens not comprising the at least one coating being modifiable when contacted with at least one medium. Not only the dimensions in terms of for example at least width and height of a surface modification being for example at least one micro lens are adjustable by applying the appropriate at least one single electromagnetic pulse, but also the shape of a surface modification is adjustable dependent on the at least one single electromagnetic pulse applied. Thus, the application of the at least one single electromagnetic pulse to the at least one coating being partially or completely covered with at least one medium being able to modify the at least one coating does not only significantly reduce the total process duration compared to the contact time disclosed in EP 3 812 142 A1, but simultaneously offers extended possibilities for obtainable surface modifications of the at least one coating. The application of at least one single electromagnetic pulse to at least one surface of a spectacle lens comprising at least one coating being modifiable when contacted with at least one medium able to modify the at least one coating results in target optical surface which are identical to the target optical surfaces achievable by the method disclosed in EP 3 812 142 A1, but the total process duration is much shorter than the contact time needed in EP 3 812 142 A1. The total process duration, i.e., the total time needed for modifying the at least one coating applied on at least one surface of an uncoated or precoated lens substrate by using at least one single electromagnetic pulse as described above, lies within a range typically from 100 µs to 7 min, further typically from 300 µs to 5 min, more typically from 500 µs to 4 min and most typically from 1 ms to 3 min.

The application of at least one single electromagnetic pulse typically comprises the application of exact one single electromagnetic pulse, the exact one single electromagnetic pulse may be subdivided as described above in at least two micro-pulses. The application of at least one single electromagnetic pulse also typically comprises the application of single electromagnetic pulses, typically at least two single electromagnetic pulses, further typically a plurality of single electromagnetic pulses, each of which again may be subdivided in at least two micro-pulses as explained before. Independent of the exact number of single electromagnetic pulses the before given explanations with respect to the at least one single electromagnetic pulse shall apply.

Summarizing, the exemplary embodiments according to the following clauses are particularly typical within the scope of the present disclosure:

Clause 1: Method of manufacturing a spectacle lens comprising a lens substrate and at least one coating, the method comprising the following steps in the given order:
Providing a lens substrate comprising an uncoated or precoated front surface and an uncoated or precoated back surface,
Covering at least one surface of the lens substrate with at least one coating being modifiable by contacting with at least medium able to modify the at least one coating,
Contacting, completely or partially, the outermost surface of the at least one coating, i.e., the surface of the at least one coating not adjacent to one of the surfaces of the lens substrate, with at the least one medium, considering the peripheral refraction of a wearer.
Applying at least one single electromagnetic pulse to at least one surface of a spectacle lens comprising the lens substrate, the at least one coating and the at least one medium,
Obtaining a spectacle lens comprising the lens substrate and the at least one coating, the surface of the at least one coating being completely or partially modified.

Clause 2: Method according to clause 1, wherein the surface topography of the at least one coating is completely or partially modified.

Clause 3: Method according to any one of the preceding clauses, wherein the modification of the surface topography of the at least one coating is at least one elevation of the at least one coating.

Clause 4: Method according to any one of the preceding clauses, wherein the modification of the surface topography of the at least one coating is a diffusion-controlled process of the at least one coating, typically a diffusion-controlled swelling process of the at least one coating.

Clause 5: Method according to any one of the preceding clauses, wherein the at least one coating is cured and/or hardened, before the at least one coating is contacted with the least one medium and before the at least one electromagnetic pulse is applied to at least one of the surfaces of a spectacle lens comprising the lens substrate, the at least one coating and the at least one medium in contact with the at least one coating.

Clause 6: Method according to any one of the preceding clauses, wherein a complete modification of the surface topography of the at least one coating is adjustable as the final optical surface of the spectacle lens.

Clause 7: Method according to any one of the preceding clauses, wherein a complete modification of the surface topography of the at least one coating is correcting or compensating a wearer's prescribed refractive power, typically for foveal vision.

Clause 8: Method according to any one of the preceding clauses, wherein a partial modification of the surface topography of the at least one coating results in at least one local swelling of the at least one coating, typically not impairing foveal vision.

Clause 9: Method according to any one of the preceding clauses, wherein a complete modification of the surface topography of the at least one coating considering the prescribed refractive power is followed by at least one partial modification of the surface topography of the at least one coating, typically comprising the following steps in the given order:
Partially covering or partially contacting the modified surface of the at least one coating with at least one medium, typically at least one specific position and/or at least one specific region, considering the peripheral refraction.
Applying at least one single electromagnetic pulse to at least one of the surfaces of a spectacle lens comprising the lens substrate, the at least one coating and the at least one medium,
Obtaining a spectacle lens comprising a lens substrate and at least one coating, the surface topography of the at least one coating being partially modified, typically comprising at least one micro lens.

Clause 10: Method according to any one of the preceding clauses, wherein the spectacle lens is further coated with at least one coating selected from at least one of the group consisting of at least one hard coating, at least one anti-reflective coating and at least one clean coating.

Clause 11: Method according to any one of the preceding clauses, wherein after the application of the at least one single electromagnetic pulse the residual at least one medium is wiped off the modified surface of the at least one coating.

Clause 12: Method according to any one of the preceding clauses, wherein the modification of the surface topography of the at least one coating is adjustable or tunable depending at least on the at least one single electromagnetic pulse applied.

Clause 13: Method according to any one of the preceding clauses, wherein the lens substrate is based on an optical material, the optical material being defined according to section 3.3.1 of DIN EN ISO 13666:2019-12 as transparent material capable of being manufactured into optical components. The spectacle lens substrate may be made of mineral glass according to section 3.3.1 of DIN EN ISO 13666:2019-12 and/or of an organic hard resin such as a thermosetting hard resin according to section 3.3.3 of DIN EN ISO 13666:2019-12; a thermoplastic hard resin according to section 3.3.4 of DIN EN ISO 13666:2019-12; or a photochromic material according to section 3.3.5 of DIN EN ISO 13666:2019-12.

Typically, the spectacle lens substrate is based on at least one of the optical materials mentioned in the following table, particularly typical on at least one of the organic hard resins.

TABLE

Examples of optical materials

| Trade name | Optical material | Average refractive index $n_D$* | Abbe number $v_D$* |
|---|---|---|---|
| CR-39, CR-330, CR-607, CR-630, RAV 700, RAV 7NG, RAV 7AT, RAV 710, RAV 713, RAV 720 | Polyallyldiglycol carbonate ((P)ADC) | 1.500 | 56 |
| RA Volution | Polyurea/Polyurethane | 1.500 | 54 |

TABLE-continued

Examples of optical materials

| Trade name | Optical material | Average refractive index $n_D$* | Abbe number $v_D$* |
|---|---|---|---|
| Trivex | Polyurea/Polyurethane | 1.530 | 45 |
| Panlite, Lexan, Makrolon | Polycarbonate (PC) | 1.590 | 29 |
| MR-6 | Polythiourethane | 1.598 | |
| MR-8 | Polythiourethane | 1.598 | 41 |
| MR-7 | Polythiourethane | 1.664 | 32 |
| MR-10 | Polythiourethane | 1.666 | 32 |
| MR-174 | Polyepisulfide | 1.738 | 32 |
| MGC 1.76 | Polyepisulfide | 1.76 | 30 |
| Spectralite | Urethane/Methacrylate | 1.54 | |
| | Mineral 1.5 | 1.525 | 58 |
| | Mineral 1.6 | 1.604 | 44 |
| | Mineral 1.7 | 1.701 | 39.2 |
| | Mineral 1.8 | 1.802 | 34.4 |
| | Mineral 1.9 | 1.885 | 30 |

*Based on sodium D line

Clause 14: Method according to any one of the preceding clauses, wherein a local surface modification of the at least one coating is resulting in a micro lens or lenslet having a height in the range of typically 1 nm to 10 µm, further typically 2 nm to 9 µm, further typically 3 nm to 8 µm, more typically in the range of 4 nm to 7 µm and most typically in the range of 5 nm to 6 µm. For a local surface modification comprising a complex shape the before mentioned ranges typically apply for the maximum height. With respect to the lateral extension, the width, typically a range of 5 µm to 20 mm, further typically of 10 µm to 10 mm, further typically of 20 µm to 5 mm, more typically of 50 µm to 4 mm and most typically of 70 µm to 3 mm may be given. The dimensions are typically determined by a white light interferometer system. With respect to the achievable surface power of a local surface modification resulting in a micro lens or lenslet a large range is adjustable by the large variety of modification possibilities mentioned before the surface power may be in a range of 0.2 diopters to 50 diopters, and is typically is a range of 0.25 diopters to 40 diopters, further typically in a range of 0.3 diopters to 30 diopters, more typically in a range of 0.4 diopters to 20 diopters and most typically in a range of 0.5 diopters to 10 diopters. The surface power may be calculated as explained in EP 3 812 142 A1.

Clause 15: A product comprising:
i) A spectacle lens, or
ii) a spectacle lens and instructions to use a spectacle lens, or
iii) a virtual representation of the spectacle lens, the representation being stored on a non-transitory data medium and/or a data signal, or
iv) a virtual representation of the spectacle lens and virtual instructions to use the spectacle lens, the representation and the instructions being stored on a non-transitory data medium, or
v) a non-transitory data medium with a virtual representation of the spectacle lens and optionally virtual instructions to use the spectacle lens, or
vi) a data signal with a virtual representation of the spectacle lens and optionally virtual instructions to use the spectacle lens,
the spectacle lens comprising a lens substrate, the lens substrate comprising an uncoated or precoated front surface and an uncoated or precoated back surface,
at least one the surfaces of the lens substrate being coated with at least one coating, the at least one coating being modifiable when contacted with at least one medium to obtain any targeted final optical surface considering at least one the group consisting of the prescribed refractive power to correct or to compensate a wearer's vision, the peripheral refraction and the as-worn position of the spectacle lens.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A method for manufacturing a spectacle lens, the spectacle lens having a lens substrate and at least one coating, the method comprising at least:
providing a lens substrate having an uncoated or precoated front surface and an uncoated or precoated back surface;
applying at least one coating to at least one of the surfaces of the lens substrate, partially or completely;
contacting the at least one surface of the at least one coating, partially or completely, with at least one medium; and
obtaining the spectacle lens having the lens substrate and the at least one coating, the surface of the at least one coating being modified,
wherein the modification of the surface of the at least one coating is a diffusion-controlled surface modification resulting in a swelling of the at least one coating, and
wherein the modification of the surface of the at least one coating is considering an individual peripheral refraction of at least one wearer's eye.

2. The method according to claim 1, wherein the modification of the surface of the at least one coating is a modification of a surface topography of the at least one coating.

3. The method according to claim 1, wherein the at least one medium is applied considering a peripheral refraction via ink jet printing.

4. The method according to claim 1, wherein the at least one coating is selected from at least one of the group consisting of at least one photochromic coating and at least one coating based on an analogous coating composition as the at least one photochromic coating without at least one photochromic dye.

5. The method according to claim 1, wherein a complete contacting of the at least one coating with the at least one medium considers a prescribed refractive power.

6. The method according to claim 1, wherein an as-worn position is considered before contacting the at least one coating with the at least one medium.

7. The method according to claim 1, wherein at least one single electromagnetic pulse is applied to at least one surface of the spectacle lens having the lens substrate, the at least one coating and the at least one medium.

8. The method according to claim 1, wherein the spectacle lens is further coated with at least one coating selected from at least one of the group consisting of at least one hard coating, at least one anti-reflective coating and at least one clean coating.

9. The method according to claim 1, wherein the at least one coat9ng is selected from at least one of the group consisting of at least one photochromic coating and at least one coating based on a coating composition for a photochromic coating but without the photochromic dyes.

10. A method for manufacturing a spectacle lens, the spectacle lens having a lens substrate and at least one coating, the method comprising at least:
providing a lens substrate comprising an uncoated or precoated front surface and an uncoated or precoated back surface;
applying at least one coating to at least one of the surfaces of the lens substrate, partially or completely;
contacting the surface of the at least one coating, partially or completely, with at least one medium,
the method further comprising
applying at least one single electromagnetic pulse or applying single electromagnetic pulses to at least one of the surfaces of the spectacle lens, the spectacle lens comprising the lens substrate, the at least one coating and the at least one medium,
removing the at least one medium (i) by the application of at least one single electromagnetic pulse or by the application of single electromagnetic pulses or (ii) after the application of at least one single electromagnetic pulse or after the application of single electromagnetic pulses; and
obtaining the spectacle lens having the at least one coating with a completely or partially modified surface, the surface of the at least one coating being modifiable when contacting or having been contacted with the at least one medium, the at least one medium being able to modify the surface of the at least one coating, whereby the modification of the surface of the at least one coating is considering the individual peripheral refraction of at least one wearer's eye.

11. The method according to claim 10, wherein the modification of the surface of the at least one coating is a modification of the surface topography of the at least one coating.

12. The method according to claim 10, wherein the modification of the surface of the at least one coating is a diffusion-controlled swelling of the at least one coating.

13. The method according to claim 10, wherein the completely or partially contacting of the surface of the at least one coating with the at least one medium is performed by printing the at least one medium on the surface of the at least one coating.

14. The method according to claim 10, wherein the at least one single electromagnetic pulse is applied to one surface of the spectacle lens comprising the lens substrate, the at least one coating and the at least one medium.

15. The method according to claim 10, wherein the at least one medium comprises at least one organic aliphatic saturated or unsaturated, optionally substituted, monocarboxylic acid.

16. The method according to claim 10, wherein the total process duration needed for modifying the at least one coating lies within a range from 100 µs to 7 min.

17. The method according to claim 10, wherein the at least one single electromagnetic pulse has an envelope in a range from 50 µs to 200 ms.

18. The method according to claim 10, wherein the at least one single electromagnetic pulse comprises light delivered by at least one electromagnetic source selected from at least one of the group consisting of at least one flash lamp, at least one halogen lamp, at least one directed plasma arc, at least one laser, at least one microwave generator, at least one induction heater, at least one electron beam, at least one stroboscope and at least one mercury lamp.

19. The method according to claim 10, wherein the at least one single electromagnetic pulse has a wavelength in the range from 100 nm to 1800 nm.

* * * * *

UNITED STATES PATENT AND TRADEMARK OFFICE
CERTIFICATE OF CORRECTION

PATENT NO. : 11,926,557 B2
APPLICATION NO. : 18/304464
DATED : March 12, 2024
INVENTOR(S) : Michel-René Christmann, Andreu Llobera Adan and Gerhard Kelch Page 1 of 1

It is certified that error appears in the above-identified patent and that said Letters Patent is hereby corrected as shown below:

On the Title Page

In Item (56) Other Publications, Publication No. 4: change "|Ultra" to -- Ultra -- and "montaging|" to -- montaging --

In the Specification

In Column 7, Line 46: change "investigative" to -- Investigative --

In Column 16, Line 15: change "the the" to -- the --

In the Claims

In Column 23, Line 32, Claim 9: change "coat9ng" to -- coating --

Signed and Sealed this
Sixteenth Day of July, 2024

Katherine Kelly Vidal
*Director of the United States Patent and Trademark Office*